United States Patent
Arishima et al.

(10) Patent No.: US 8,722,128 B2
(45) Date of Patent: May 13, 2014

(54) FOAMABLE OIL-IN-WATER EMULSIFIED OIL COMPOSITION FOR CHILLED-DISTRIBUTION WHIPPED CREAMS AND WHIPPED CREAM

(75) Inventors: Tamio Arishima, Takasago (JP); Takashi Yanagita, Takasago (JP)

(73) Assignee: Kaneka Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/387,552

(22) PCT Filed: Jul. 19, 2011

(86) PCT No.: PCT/JP2011/066334
§ 371 (c)(1),
(2), (4) Date: Jan. 27, 2012

(87) PCT Pub. No.: WO2012/008603
PCT Pub. Date: Jan. 19, 2012

(65) Prior Publication Data
US 2013/0115360 A1 May 9, 2013

(30) Foreign Application Priority Data
Jul. 16, 2010 (JP) .................................. 2010-162125

(51) Int. Cl.
*A23L 1/00* (2006.01)
*A23D 7/00* (2006.01)
*A23L 1/19* (2006.01)

(52) U.S. Cl.
CPC .. *A23L 1/19* (2013.01); *A23L 1/193* (2013.01)
USPC ............................ 426/564; 426/570; 426/602

(58) Field of Classification Search
CPC ................................. A23L 1/19; A23L 1/193
USPC ................................................ 426/564, 570
See application file for complete search history.

(56) References Cited

U.S. PATENT DOCUMENTS 5,690,986 A * 11/1997 Okutomi et al. ............. 426/604

FOREIGN PATENT DOCUMENTS

| JP | 64-023867 | | 1/1989 |
| JP | 5-219887 | | 8/1993 |
| JP | 05219887 A | * | 8/1993 |
| JP | 2002-058441 | | 2/2002 |
| JP | 2007-282535 | | 11/2007 |
| JP | 2008-228610 | | 10/2008 |
| JP | 2008228610 A | * | 10/2008 |
| WO | WO 2009/025123 A1 | | 2/2009 |

OTHER PUBLICATIONS

Bockisch, Michael, Fats and oils handbook, 1998, AOCS Press, pp. 273-275.*
U.R. Sahasranamam, Coconut oil and Palm kernel oil, IOI group, date of printing Apr. 22, 2013, pp. 26.*
International Search Report issued in International Application No. PCT/JP2011/066334.
Verified Translation of PCT Written Opinion of the International Searching Authority, date of mailing Oct. 25, 2010, issued in International Application No. PCT/JP2011/066334.

* cited by examiner

*Primary Examiner* — Jyoti Chawla
(74) *Attorney, Agent, or Firm* — Novak Druce Connolly Bove + Quigg LLP

(57) ABSTRACT

A foamable oil-in-water emulsified oil composition for chilled-distribution whipped creams, characterized in that: the oil content is 20 to 40 wt %; the oil contains an oil (A) containing trigricerides in which the constituent fatty acids have total carbon atom numbers of 36 and 38 in a total amount 40 wt % and having a rising slip point of 30° C. or higher and an oil (B) selected from hardened palm kernel oils and a hardened coconut oils; the content of the oil (A) is 1 to 30 wt % with respect to the total amount of the oil; the content of the oil (B) is 5 to 30 wt % with respect to the total amount of the oil; the total content of the oils (A) and (B) is 15 to 50 wt % with respect to the total amount of the oil; the crystallinity of the oil, after the composition is stored at 5° C. for 4 days is 50% or more; and the difference between the crystallinity of the oil after the composition is stored at 5° C. for 1 hour and the crystallinity of the oil after the composition is stored at 5° C. for 1 hour time and additionally at 15° C. for 30 minutes is 2% or less.

16 Claims, No Drawings

US 8,722,128 B2

FOAMABLE OIL-IN-WATER EMULSIFIED OIL COMPOSITION FOR CHILLED-DISTRIBUTION WHIPPED CREAMS AND WHIPPED CREAM

CROSS-REFERENCE TO RELATED APPLICATIONS

This application is a National Stage filing under 35 U.S.C. §371 of International Application No. PCT/JP2011/066334, filed Jul. 19, 2011, which claims priority to Japanese Patent Application No. 2010-162125, filed Jul. 16, 2010. The disclosures of the prior applications are incorporated herein in their entirety by reference.

TECHNICAL FIELD

The present invention relates to a foamable oil-in-water emulsified oil composition for chilled-distribution whipped creams and a whipped cream containing the composition.

BACKGROUND ART

Natural fresh cream prepared from milk has been used for production of whipped creams for confectioneries and desserts. However recently, compounded whipped creams in which some of the milk fat contained in the fresh cream is replaced with vegetable oil and also pure-vegetable whipped creams in which all fat is replaced with vegetable oil are developed and now becoming mainstream products. Such whipped creams are cost-effective and superior, particularly for example, in storage stability of the raw solution before whipping, processability during whipping and processability after whipping. In addition, such a foamable oil-in-water emulsified oil composition for whipped cream containing a vegetable oil (raw solution before whipping) can be produced by emulsification of fresh cream and various vegetable oils additionally with improvers such as emulsifiers and thickeners. It is thus possible to change the texture and physical properties of the whipped cream significantly by modification of the composition of these raw materials, in particular of the oils. In the recent trend particularly toward lighter texture, emphasis is directed to their mouth melting characteristics.

The oil used in such a foamable oil-in-water emulsified oil composition for whipped creams is for example a lauric acid-type oil such as coconut oil or palm kernel oil. The lauric acid-type oil is a sharp melting fat that is superior in mouth melting characteristics and refreshing. The lauric acid-type oils have been used together with their hardened oils in production of foamable oil-in-water emulsified oil compositions for whipped creams, mainly of foamable oil-in-water emulsified oil compositions for whipped creams having a smaller oil content (hereinafter, referred to as "light creams"). However, conventional foamable oil-in-water emulsified oil compositions for whipped creams, which contain much hardened lauric acid-type oils, easily become harder over time after whipping, thus making the processability such as topping thereof more difficult over time.

In addition, because a light cream has a smaller oil content, its whipping characteristics change significantly when the temperature of the raw solution before whipping increases by several degrees. Excessively higher temperature often resulted in insufficient incorporation of air bubbles and gave inappropriate overrun.

Foamable oil compositions for creams containing oils ester-exchanged with palm oil or a lauric acid-type oil and also containing a lauric acid-type oil were proposed for improvement of whip physical properties and mouth melting characteristics after whipping (Patent Document 1). However, it was difficult to suppress the change over time in hardness of the composition after whipping.

Also proposed was an oil composition for whipped creams, in which: the content of lauric acid residues in all triglycerides in the oil is 30 to 60 mass % with respect to the total amount of the fatty acid residues; the content of triglycerides containing fatty acid residues having a carbon atom number of 42 to 49 is 20 to 45 mass % with respect to the total amount of the triglyceride; and the content of triglycerides containing fatty acid residues having a carbon atom number of 50 to 62 is 4 to 15 mass % with respect to the total amount of the triglyceride (Patent Document 2). The composition shows favorable stability in shape in normal temperature range (approximately 15 to 35° C.) and gives normal temperature-distribution whipped creams (foamable oil-in-water emulsified fat) that show favorable mouth melting characteristics and are superior in long-term emulsion stability during storage at normal temperature and resistant to hardening when stored at normal temperature. However, the properties are lost in the chilled region.

Also proposed was an oil-in-water emulsified oil composition containing an ester-exchanged oil prepared by ester exchange between at least one oil (1) selected from the group consisting of lauric acid-type oils, fractionated lauric acid-type oils, and extremely hardened lauric acid-type oils; and an oil containing saturated fatty acids having a carbon number of 16 or more and unsaturated fatty acids having a carbon number of 16 or more at a particular rate (Patent Document 3). Because of the composition above, the composition is favorable in mouth melting characteristics, whipping characteristics such as foaming and whip physical properties such as stability in shape, but it is not possible to suppress the change in hardness over time after whipping sufficiently.

There was a study on suppression of the change in hardness over time after whipping and an oil for light creams containing SUS-type triglycerides and a lauric acid-type oil was proposed (Patent Document 4). Although there is no problem in suppression of the change in hardness over time after whipping in the case of the whipped cream obtained from the cream oil, since increase of the temperature of the raw solution by several degrees leads to decrease of the overrun due to insufficient air bubble incorporation and loss of normal whipping characteristics, the whipped cream demanded stricter temperature control and was thus lower in processability.

CITATION LIST

Patent Literature

Patent Document 1: WO 09/025,123
Patent Document 2: JP-A No. 2007-282535
Patent Document 3: JP-A No. 2008-228610.
Patent Document 4: JP-A No. 5-219887

SUMMARY OF INVENTION

Technical Problem

An object of the present invention is to provide a foamable oil-in-water emulsified oil composition for preparation of whipped creams having a smaller oil content and showing favorable mouth melting characteristics that retains or has smaller change in its whipping characteristics at a level higher than normal level even when the temperature of the raw solution changes during storage, and that does not become harder in handling at room temperature after whipping and very superior in processability such as topping and also in whip physical properties such as appearance after whipped cream applying.

Solution to Problem

After intensive studies to solve the problems above, the inventors have found that it is possible, by blending an oil having a particular total carbon atom number and a rising slip point with a hardened lauric acid-type oil at a particular rate, to optimize the crystallinity of the oil in the foamable oil-in-water emulsified oil composition and provide a foamable oil-in-water emulsified oil composition for whipped creams that retains traditional whipping characteristics and mouth melting characteristics and has whipping characteristics at a level higher than normal level and smaller change in whipping characteristics even when the temperature of the raw solution changes during storage, and that does not become harder in handling at room temperature after whipping of the raw solution, and made the present invention.

Accordingly, an aspect of the present invention is a foamable oil-in-water emulsified oil composition for chilled-distribution whipped creams containing an oil, characterized in that: the content of the oil is 20 wt % to 40 wt % with respect to the total amount of the composition; the oil contains an oil (A) and an oil (B); the oil (A) contains triglycerides in which the constituent fatty acids have a total carbon atom number of 36 and triglycerides in which the constituent fatty acids have a total carbon atom number of 38 in a total amount of 40 wt % or more with respect to the total amount of the oil (A), and have a rising slip point of 30° C. or higher; the oil (B) is a hardened palm kernel oil and/or a hardened coconut oil; the content of the oil (A) is 1 wt % to 30 wt % with respect to the total amount of the oil; the content of the oil (B) is 5 wt % to 30 wt % with respect to the total amount of the oil; the total content of the oils (A) and (B) is 15 wt % to 50 wt % with respect to the total amount of the oil; the crystallinity of the oil after the composition is stored at 5° C. for 4 days is 50% or more; and the difference between the crystallinity of the oil after the composition is stored at 5° C. for 1 hour and the crystallinity of the oil after the composition is stored at 5° C. for 1 hour time and additionally at 15° C. for 30 minutes is 2% or less.

In a favorable embodiment of the present invention, the oil contains a lauric acid-type oil and the content of the lauric acid-type oil is 60 wt % or more with respect to the total amount of the oil. More preferably, the oil contains an oil having a rising slip point of lower than 30° C. other than the oil (B). More preferably, the oil (A) is palm kernel stearin.

A second aspect of the present invention is a whipped cream containing the foamable oil-in-water emulsified oil composition for chilled-distribution whipped creams.

Advantageous Effects of Invention

Provided according to the present invention is a foamable oil-in-water emulsified oil composition for preparation of whipped creams having a smaller oil content and showing favorable mouth melting characteristics that has whipping characteristics at a level higher than normal level and smaller change in whipping characteristics even when the temperature of the raw solution changes during storage, and that does not become harder in handling at room temperature after whipping and very superior in whip physical properties such as processability and appearance after whipped cream applying.

In the present invention, the whipping characteristics at a level higher than normal level means that the composition has an overrun of 100% or more even when the liquid temperature changes during storage. The smaller change in whipping characteristics means the change of overrun is 20% or less.

DESCRIPTION OF EMBODIMENTS

Hereinafter, the present invention will be described in more detail. The foamable oil-in-water emulsified oil composition according to the present invention (hereinafter, referred to as the "inventive composition") is characterized in that the content of the oil and the crystallinity of the oil are in particular ranges. The foamable oil-in-water emulsified oil composition is more advantageous when used as an ingredient for chilled-distribution whipped creams.

The oil content in the foamable oil in water emulsified oil composition according to the present invention is 20 wt %~40 wt %, preferably 25 wt % to 35 wt %, with respect to the total amount of the composition. An oil content of less than 20 wt % may result in lowered whipping efficiency. Alternatively, an oil content of more than 40 wt % may lead to loss of the mouth melting characteristics of the whipped cream obtained from the inventive composition after chilled distribution or deterioration in emulsion stability of the inventive composition.

The crystallinity of the oil in the inventive composition is the oil crystallinity (%) in the total amount of the oil in the composition, which is calculated in accordance with the following Formula:

$$\text{Oil crystallinity} = [(x-y)/z] \times 100$$

[wherein, x is a value obtained by measurement of the inventive composition by using a NMR analysis apparatus; y is a value obtained by measurement of a composition identical in composition to the inventive composition used for measurement of x, except that the entire oil contained in the inventive composition is replaced with a salad oil having a cloud point of lower than 0° C., as determined in a manner similar to above by using the same NMR analysis apparatus; and z is the oil content (wt %) of the inventive composition used for measurement of x].

The NMR analysis apparatus used in measurement of x and y above is a Minispec series product "mq20 NMR Analyzer" Manufactured by BRUKER. In addition, Bruker the MINISPEC was used as its analytical software.

The crystallinity of the oil in the foamable oil-in-water emulsified oil composition according to the present invention is 50% or more, more preferably 50% to 90%, after storage at 5° C. for 4 days. Since a crystallinity of less than 50% may lead to insufficient crystallization of the emulsified oil, it is difficult to incorporate air, giving unsuitable overrun. The crystallinity of oil does not change significantly after storage at around 5° C. for 3 days or more. In addition, a crystallinity of much more than 90% may lead to deterioration in stability of the raw solution.

In addition, the difference between the crystallinity of the oil when the foamable oil-in-water emulsified oil composition according to the present invention is stored at 5° C. for 1 hour and the crystallinity of the oil when it is stored at 5° C. for 1 hour and additionally at 15° C. for 30 minutes is 2% or less, more preferably 1% or less. A crystallinity difference of more than 2% may lead to change of the whipping characteristics, if the temperature of the raw solution changes during storage of the foamable oil-in-water emulsified oil composition.

A foamable oil-in-water emulsified oil composition satisfying the requirement in crystallinity above has the advantageous effects of the present invention and can be prepared easily if it has the following composition.

The oil (A) contains triglycerides in which the constituent fatty acids have a total carbon atom number of 36 and triglycerides in which the constituent fatty acids have a total carbon atom number of 38 in a total amount of 40 wt % or more with respect to the total amount of the oil (A) and has a rising slip point of 30° C. or higher. The rising slip point of oil can be determined in accordance with "Standard Methods for the Analysis of Fats, Oils and Related Materials 2.2.4.2-1996, Melting point, 2003 Ed, Japan Oil Chemists' Society." Examples of the oils (A) include palm kernel stearin, hardened palm kernel stearin oil and the like (see Table 1), and palm kernel stearin is preferable from the point of mouth melting characteristics.

In addition, the foamable oil-in-water emulsified oil composition according to the present invention preferably contains a lauric acid-type oil in an amount of 60 wt % or more with respect to the total amount of the oil. In this way, the whipped cream prepared by whipping the inventive composition has further improved mouth melting characteristics. A lauric acid-type oil content of far lower than 60 wt % may result in loss of the mouth melting characteristics as a chilled-distribution whipped cream. In the present invention, the lauric acid-type oils are oils derived from coconut oil or palm kernel oil, which includes hardened oils, ester-exchanged oils, and the fractionated oils thereof. The oils (A) and (B) also belong to the lauric acid-type oils, and the total content of the oils (A) and (B) and the other lauric acid-type oil is preferably adjusted to be 60 wt % or more.

The foamable oil-in-water emulsified oil composition according to the present invention may contain additionally

TABLE 1

Content of triglycerides containing constituent fatty acids having total carbon numbers of 36 and 38 in various oils

|  | Palm kernel stearin (IV7.6) | Hardened palm kernel stearin oil (IV 1.0) | Hardened palm kernel oil (melting point: 35° C.) | Palm kernel oil | Coconut oil | Hardened coconut oil (melting point: 34° C.) | Palm kernel olein |
|---|---|---|---|---|---|---|---|
| Rising slip point (° C.) | 33 | 36 | 40 | 27 | 25 | 34 | 23 |
| Triglycerides having total 36 carbon atoms* | 26.3 | 26.3 | 20.8 | 20.8 | 18.8 | 18.8 | 17.8 |
| Triglycerides having total 38 carbon atoms* | 24.3 | 24.2 | 15.9 | 15.9 | 16.4 | 16.4 | 11.4 |
| Sum of triglycerides having carbon numbers of 36 and 38* | 60.6 | 60.6 | 36.7 | 36.7 | 35.2 | 35.2 | 29.2 |

*Content in all constituent fatty acids (wt %)

The content of the oil (A) is 1 wt % to 30 wt %, more preferably 5 wt % to 30 wt %, with respect to the total amount of the oil in the foamable oil-in-water emulsified oil composition. An oil (A) content of less than 1 wt % may lead to gradual hardening of the whipped cream after whipping. On the other hand, an oil (A) content of more than 30 wt % may lead to insufficient stability in shape after whipping.

The oil (B) is hardened palm kernel oil and/or a hardened coconut oil. The content of the oil (B) is 5 wt % to 30 wt %, preferably 15 wt % to 30 wt %, with respect to the total amount of the oil in the foamable oil-in-water emulsified oil composition. An oil (B) content of less than 5 wt % may lead to insufficient stability in shape during whipping. An oil (B) content of more than 30 wt % may result in loss of the mouth melting characteristics of the chilled-distribution light cream during whipping and hardening of the whipped cream over time after whipping.

In the foamable oil-in-water emulsified oil composition according to the present invention, the total content of the oils (A) and (B) is 15 wt % to 50 wt %, preferably 25 wt % to 50 wt %, with respect to the total amount of the oil. A total content of less than 15 wt % may result in insufficient hardening during whipping and insufficient stability in shape. Alternatively, a total content of more than 50 wt % may result in loss of mouth melting characteristics as a chilled-distribution light cream.

The foamable oil-in-water emulsified oil composition according to the present invention may contain an oil (C) other then the oils (A) and (B), if the oil (C) is an edible oil having a rising slip point of lower than 30° C. The oil (C) having a rising slip point of lower than 30° C. may contain an lauric acid-type oil.

various additives commonly used in oil-in-water emulsified oil compositions and whipped creams, such as raw milk materials, emulsifiers, salts, sugars, thickeners, flavoring agents, and colorants.

The raw milk materials are commonly used raw milk materials, and example thereof include, but are not limited to milk, defatted milk, full-fat condensed milk, defatted condensed milk, skim milk powder, full-fat milk powder, butter milk, butter milk powder, concentrated whey, whey powder, fresh cream, sweetened condensed milk, sugar-free condensed milk, butter, cheese, casein protein, whey protein, casein sodium, milk proteins separated and/or fractionated with UF membrane or ion-exchange resin treatment and the like.

The emulsifier is not particularly limited, if it is an emulsifier for use in foods, and examples thereof include sucrose fatty acid esters, lecithins, lecithin derivatives, glycerol fatty acid esters, monoglycerol fatty acid esters and the derivatives thereof, polyglycerin fatty acid esters, sorbitan fatty acid esters, propylene glycol fatty acid esters, polyoxyethylene sorbitan fatty acid esters and the like. It is preferable to use an emulsifier in order to reduce the change in whipping characteristics caused by the temperature change during storage of the raw solution storage. The content of the emulsifier is preferably 0.05 wt % to 1 wt % with respect to the total amount of the foamable oil-in-water emulsified oil composition.

The salt is not particularly limited, if it is used for food applications, and examples thereof include sodium and potassium phosphates, sodium citrate and the like.

Examples of the sugars include sugars such as caster sucrose, brown sugar, granule sugar, granulated sugar, processed sugars, and liquid sugars; carbohydrates such as glutinous starch syrup, glucose, isomerized sugar, fructose, maltose, and lactose; sugar alcohols such as reduced glutinous starch syrup and reduced glutinous maltose syrup; and the like.

Examples of the thickeners include guar gum, xanthan gum, agar, pectin, sodium alginate, carrageenan, jellan gum, locust bean gum, gum arabic, carboxymethylcellulose (CMC) and the like.

The flavoring agent and the colorant are used as needed, and are not particularly limited, if they are commonly used for food applications.

Various additives above may be used alone or in combination of two or more.

The foamable oil-in-water emulsified oil composition according to the present invention can be prepared in a manner similar to common oil-in-water emulsified oil compositions, with a blending composition similar to them, except that the particular oils described above are used. For example, various additives described above are dissolved in water previously heated to 60° C., to give an aqueous phase. Similarly, an oil containing the oils (A) and (B) at a particular rate is heated to 60° C. and various additives are dissolved therein, to give an oil phase. The water and oil phases prepared are mixed with each other in such a manner that the content of the oil contained in the oil phase becomes 20 wt % to 40 wt % in the entire mixture. The mixture obtained is emulsified preliminary, sterilized for example by UHT sterilization, homogenized, and cooled to 5° C. to 10° C., to give a desired foamable oil-in-water emulsified oil composition according to the present invention.

The method for preparing a whipped cream by using the foamable oil-in-water emulsified oil composition according to the present invention is not particularly limited, and any common whipping method may be used. Typical examples of the whipping methods include those by using a kitchen whisk, those by using a beater, those by using, for example, a vertical cake mixer or a pressure mixer, and the like. The foamable oil-in-water emulsified oil composition according to the present invention is whipped, as it is agitated with air being incorporated by these methods. At least one of the various additives described above may be further added then to the foamable oil-in-water emulsified oil composition according to the present invention, if needed.

The foamable oil-in-water emulsified oil composition according to the present invention shows smaller change in whipping characteristics even when the temperature of the raw solution changes during storage and the whipped cream obtained after whipping does not become harder, even if it is stored under chilling condition for an extended period of time. Accordingly, the whipped cream prepared by using the foamable oil-in-water emulsified oil composition according to the present invention is favorable for chilled distribution.

EXAMPLES

Hereinafter, the present invention will be described in more detail specifically with reference to Examples, but it should be understood that the present invention is not restricted by these Examples at all. The "part" and "%" in Examples are those by weight.

<Method for Measuring Crystallinity>

1.5 g of each of the raw solutions of the foamable oil-in-water emulsified oil compositions obtained in Examples and Comparative Examples was placed and stored in a NMR tube under a particular condition, and the sample was analyzed in a NMR analysis apparatus (Minispec series "mq20 NMR Analyzer, analytical software: BRUKER the MINISPEC,", manufactured by BRYKER) to give a value (x). Separately, a foamable oil-in-water emulsified oil composition in the same composition, except that the entire oil was replaced with a salad oil (rapeseed oil) having a cloud point of less than 0° C. was prepared (Preparative Example 3). 1.5 g of the raw solution of the composition was placed in a NMR tube and the sample was analyzed similarly; to give a value (y). Further, the oil content (wt %) of the foamable oil-in-water emulsified oil composition having the value (x) was designated as value (z). The crystallinity (%) was calculated in accordance with the following Formula:

$$\text{crystallinity (\%)}=[(x-y)/z]\times 100$$

<Method for Measuring the Total Carbon Atom Number of Constituent Fatty Acids>

The total carbon atom number of the constituent fatty acids was determined in accordance with the Standard Methods for the Analysis of Fats, Oils and Related Materials 2.4.6.1, Triacylglycerol composition, by using a gas chromatographic system (trade name: 6890N Network GS System, manufactured by Agilent Technologies).

<Whipping Method>

4 kg of each of the foamable oil-in-water emulsified oil compositions obtained in Examples and Comparative Examples and 320 g of granulated sugar were placed in a Kanto mixer (CS type 20, Kanto Kongoki Industrial Co., Ltd.) and the mixture was whipped under high-speed agitation condition (450 rpm). Whipping was continued, as the appearance thereof was monitored, until the surface state and the hardness of the mixture became optimal, to give a whipped cream.

<Method for Evaluating Texture>

The texture of each of the foamable oil-in-water emulsified oil compositions obtained in Examples and Comparative Examples was evaluated by 10 experienced professional panelists organoleptically by tasting, and the evaluation results were collected. The evaluation criteria then are as follows:

A: Very favorable mouth melting characteristics
B: Favorable mouth melting characteristics
C: Slightly hard texture and unfavorable mouth melting characteristics
D: Very hard texture and very unfavorable mouth melting characteristics <Method for Measuring Overrun>

The overrun, which is an indicator of whipping characteristics is defined as the rate of air incorporated into a whipped cream by whipping a foamable oil-in-water emulsified oil composition, and calculated in accordance with Formula below. The whipping characteristics were evaluated, based on the values of overrun in accordance with the following criteria.

$$\text{Overrun (\%)}=[(s-t)/t]\times 100$$

wherein, s represents the weight of a foamable oil-in-water emulsified oil composition at a particular volume, and t represents the weight of the whipped cream at a particular volume.

A: 120% or more (most favorable)
B: 110% or more and less than 120% (favorable).
C: 100% or more and less than 110% (good)
D: 100% or less (unfavorable)

A whipped cream immediately after whipping was placed in a cylindrical container having a diameter of 50 mm and a depth of 20 mm and the hardness thereof was determined at a depth of 10 mm, a speed of 5 mm/sec, and a measurement number of 1, by using a creep meter "RE2-33005S (manufactured by Yamaden Co., Ltd.)" and a cylindrical plunger having a diameter of 16 mm. The hardness was evaluated then in accordance with the following criteria:

A: 0.3 N or more and less than 0.35 N (most favorable)
B: 0.25 N or more and less than 0.3 N, or 0.35 N or more and less than 0.4 N (favorable)
C: 0.2 N or more and less than 0.25 N, or 0.4 N or more and less than 0.45 N (good)
D: less than 0.2 N, or 0.45 N of more (unfavorable)

<Evaluation of the Change in Hardness Over Time>

A whipped cream immediately after whipping was placed in a cylindrical container having a diameter of 50 mm and a depth of 20 mm and the hardness thereof was determined at a depth of 10 mm, a speed of 5 mm/sec, and a measurement number of 1 by using a creep meter "RE2-33005S (manufactured by Yamaden Co., Ltd.)" and a cylindrical plunger having a diameter of 16 mm. The hardness of the whipped cream after storage at 20° C. (room temperature) for 30 minutes after whipping was determined similarly and the difference was calculated. The change in hardness was then evaluated in accordance with the following criteria:

A: less than ±0.015 N (most favorable)
B: ±0.015 N or more and less than ±0.03 N (favorable)
C: ±0.03 N or more and less than ±0.05 N (good)
D: ±0.05 N or more (unfavorable)

Preparative Example 1

Preparation of Oil (C1)

An ester-exchanged oil (C1) was prepared. Specifically, in accordance with the composition shown in Table 2, a raw oil consisting of 50 parts of palm oil (non-lauric acid-type oil) and 50 parts of palm kernel olein (lauric acid-type oil) was fed into a random reactor and heated, as it is agitated under reduced pressure, until the system became 90° C. and 30 mmHg (4.0 kPa) and then dehydrated. Then, 0.1 part of sodium methylate was added thereto, and the mixture was allowed to react at 90° C. under nitrogen stream for 30 minutes, as it is agitated. 100 parts of hot water (liquid temperature: approximately 70° C.) was added to the reaction mixture obtained for cleaning. The same hot-water cleaning was repeated, until the pH of the cleaning water became 8, and the mixture was heated as it is agitated under reduced pressure and dehydrated, until the system became 90° C. and 30 mm Hg (4.0 kPa). Subsequently, 2 parts of activated clay was added thereto and the mixture was decolorized as it is agitated under reduced pressure for 30 minutes. All of the reaction mixture obtained was filtered for removal of the activated clay. Finally, the filtrate was deodorized at 250° C. and 2 mmHg (0.27 kPa) for 60 minutes, to give an ester-exchanged oil (C1). The rising slip point of the oil (C1) was 29° C. In addition, the oil (C1) contained the lauric acid-type oil and the non-lauric acid-type oil at a ratio of 1:1 (by weight).

Preparative Example 2

Preparation of Oil (C2)

An ester-exchanged oil (C2) was prepared in a manner similar to Preparative Example 1, except that 100 parts of coconut oil (lauric acid-type oil) was used instead of 50 parts of palm kernel olein and 50 parts of palm oil used as the raw material oils, as shown in Table 2. The oil (C2) was a lauric acid-type oil and its rising slip point was 27° C.

Preparative Example 3

Preparation of a Foamable Oil-in-Water Emulsified Oil Composition for Measurement of Crystallinity A foamable oil-in-water emulsified oil composition was prepared in accordance with the composition shown in Table 3. Specifically, 30 parts of the oil was heated to 60° C., 0.2 part of soy bean lecithin (emulsifier) and 0.1 part of a polyglycerin fatty acid ester (HLB: 4.5, emulsifier) were dissolved therein, to give an oil phase.

Separately, 0.01 part of xanthan gum (thickener), 0.05 part of guar gum (thickener), 0.15 part of a polyglycerin fatty acid ester (HLB: 11.6, emulsifier), 0.07 part of sodium hexametaphosphate (salt), and 0.05 part of a sucrose fatty acid ester (HLB: 11, emulsifier) were dissolved in 64.37 parts of hot water at 60° C., and 4.0 parts of skim milk powder (raw milk material) and 1.0 part of whey powder (raw milk material) were dissolved additionally therein, to give an aqueous phase.

The oil phase and the water phase thus obtained were mixed, as the mixture was agitated at 60° C. for 20 minutes, to give a preliminary emulsion. The preliminary emulsion was sterilized, as it is placed in a directly vapor-injecting sterilization machine at 142° C. for 4 seconds, homogenized at 6.0 MPa and cooled in a plate-type cooling device to a final temperature of 5° C. The foamable oil-in-water emulsified oil composition obtained was filled in a container.

After the foamable oil-in-water emulsified oil composition obtained was stored under the condition similar to that for the foamable oil-in-water emulsified oil composition obtained in Examples and Comparative Examples, the measured value (y) was determined in accordance with the "method for measuring crystallinity" described above. The measured value (y) was 1.1.

Example 1

Preparation and Evaluation of Foamable Oil-in-Water Emulsified Oil Composition 1

A foamable oil-in-water emulsified oil composition 1 (hereinafter, referred to as the "inventive composition 1") was prepared in a manner similar to Preparative Example 3,

TABLE 2

(blending unit: wt parts)

| | | Preparative Example 1 (oil (C1)) | Preparative Example 2 (oil (C2)) |
|---|---|---|---|
| Composition | Palm kernel olein | 50 | |
| | Coconut oil | | 100 |
| | Palm oil | 50 | |
| Rising slip point (° C.) after interesterification | | 29 | 27 | except that the composition of the oil(s) in the oil phase was modified in accordance with the composition shown in Table 3. The crystallinity of the oil in the inventive composition 1 was favorably 74.3%, after storage at 5° C. for 4 days. Similarly, the crystallinity of the oil after the inventive composition 1 obtained was stored at 5° C. (setting) for 1 hour and the crystallinity of the oil after it is stored at 5° C. (setting) for 1 hour and additionally at 15° C. (setting) for 30 minutes were determined, and the difference between them was 1.0%. The results are summarized in Table 3. The content of each oil (wt %) in Table 3 is a value effective at a first decimal point, which is obtained as it is rounded off to one decimal place.

Then, the inventive composition 1 was stored at 5° C. (setting) for 4 days and additionally at 12.5° C. (setting) for 3 hours and then whipped by the method described above. The texture, overrun, hardness, and change in hardness over time of the whipped cream obtained were determined by the methods described above. The results are summarized in Table 4.

TABLE 3

Composition and evaluation result of foaming oil-in-water emulsified oil compositions (blending unit: wt parts)

| | | | Preparative Example 3 | Example 1 | Example 2 | Example 3 | Example 4 | Comparative Example 1 |
|---|---|---|---|---|---|---|---|---|
| Oil phase | Oil (A) | Palm kernel stearin (IV7.6) | | 5 | 5 | 8 | 2 | |
| | Oil (B) | Hardened palm kernel oil (rising slip point: 35° C.) | | 5 | 5 | 2 | 8 | 10 |
| | | Palm kernel oil | | 18 | 13 | 18 | 20 | 18 |
| | | Coconut oil | | | 5 | | | |
| | | Oil (C1) | | 2 | | 2 | | 2 |
| | | Oil (C2) | | | 2 | | | |
| | | Palm oil | | | | | | |
| | | Rapeseed salad oil | 30 | | | | | |
| | | Soy bean lecithin | 0.2 | 0.2 | 0.2 | 0.2 | 0.2 | 0.2 |
| | | Polyglycerin fatty acid ester (HLB = 4.5) | 0.1 | 0.1 | 0.1 | 0.1 | 0.1 | 0.1 |
| Aqueous phase | | Sodium hexametaphosphate | 0.07 | 0.07 | 0.07 | 0.07 | 0.07 | 0.07 |
| | | Guar Gum | 0.05 | 0.05 | 0.05 | 0.05 | 0.05 | 0.05 |
| | | Xanthan gum | 0.01 | 0.01 | 0.01 | 0.01 | 0.01 | 0.01 |
| | | Polyglycerin fatty acid ester (HLB = 11.5) | 0.15 | 0.15 | 0.15 | 0.15 | 0.15 | 0.15 |
| | | Sucrose fatty acid ester (HLB = 11) | 0.05 | 0.05 | 0.05 | 0.05 | 0.05 | 0.05 |
| | | Skim milk powder | 4.0 | 4.0 | 4.0 | 4.0 | 4.0 | 4.0 |
| | | Whey powder | 1.0 | 1.0 | 1.0 | 1.0 | 1.0 | 1.0 |
| | | Water | 64.37 | 64.37 | 64.37 | 64.37 | 64.37 | 64.37 |
| Total | | | 100.0 | 100.0 | 100.0 | 100.0 | 100.0 | 100.0 |
| Content of lauric acid-type oil in entire oil in oil phase (wt %) | | | — | 96.7 | 100 | 96.7 | 100 | 96.7 |
| Content of oil (A) in entire oil in oil phase (wt %) | | | — | 16.7 | 16.7 | 26.7 | 6.7 | 0 |
| Content of oil (B) in entire oil in oil phase (wt %) | | | — | 16.7 | 16.7 | 6.7 | 26.7 | 33.3 |
| Content of oil (C) in entire oil in oil phase (wt %) | | | — | 66.6 | 66.6 | 66.6 | 66.6 | 66.6 |
| Total amount of oils (A) and (B) in entire oil in oil phase (wt %) | | | — | 33.3 | 33.3 | 33.3 | 33.3 | 33.3 |
| Crystallinity of oil after storage at 5° C. for 4 days (%) | | | — | 74.3 | 73 | 69 | 73.7 | 80.7 |
| Crystallinity of oil after storage at 5° C. for 1 hour (%) | | | — | 75.7 | 75 | 70.7 | 74.3 | 80.7 |
| Crystallinity of oil after storage at 15° C. for 30 minutes (%) | | | — | 74.7 | 74.7 | 70.3 | 73 | 73 |
| X-Y (%) | | | — | 1.0 | 0.3 | 0.4 | 1.3 | 7.7 |

(blending unit: wt parts)

| | | | Comparative Example 2 | Comparative Example 3 | Comparative Example 4 | Comparative Example 5 | Comparative Example 6 |
|---|---|---|---|---|---|---|---|
| Oil phase | Oil (A) | Palm kernel stearin (IV7.6) | 10 | 8.3 | 2.5 | 10 | 5 |
| | Oil (B) | Hardened palm kernel oil (rising slip point: 35° C.) | | 8.3 | 2.5 | 10 | 5 |
| | | Palm kernel oil | 18 | 30 | 10 | 10 | |
| | | Coconut oil | | | | | |
| | | Oil (C1) | 2 | 3.4 | | | |
| | | Oil (C2) | | | | | |
| | | Palm oil | | | | | 20 |
| | | Rapeseed salad oil | | | | | |
| | | Soy bean lecithin | 0.2 | 0.2 | 0.2 | 0.2 | 0.2 |
| | | Polyglycerin fatty acid ester (HLB = 4.5) | 0.1 | 0.1 | 0.1 | 0.1 | 0.1 |
| Aqueous phase | | Sodium hexametaphosphate | 0.07 | 0.07 | 0.07 | 0.07 | 0.07 |
| | | Guar Gum | 0.05 | 0.05 | 0.05 | 0.05 | 0.05 |
| | | Xanthan gum | 0.01 | 0.01 | 0.01 | 0.01 | 0.01 |
| | | Polyglycerin fatty acid ester (HLB = 11.5) | 0.15 | 0.15 | 0.15 | 0.15 | 0.15 |
| | | Sucrose fatty acid ester (HLB = 11) | 0.05 | 0.05 | 0.05 | 0.05 | 0.05 |
| | | Skim milk powder | 4.0 | 4.0 | 4.0 | 4.0 | 4.0 |
| | | Whey powder | 1.0 | 1.0 | 1.0 | 1.0 | 1.0 |
| | | Water | 64.37 | 44.37 | 79.37 | 64.37 | 64.37 |
| Total | | | 100.0 | 100.0 | 100.0 | 100.0 | 100.0 |
| Content of lauric acid-type oil in entire oil in oil phase (wt %) | | | 96.7 | 96.6 | 100 | 100 | 33.3 |
| Content of oil (A) in entire oil in oil phase (wt %) | | | 33.3 | 16.6 | 16.7 | 33.3 | 16.7 |

TABLE 3-continued

Composition and evaluation result of foaming oil-in-water emulsified oil compositions

| | | | | | |
|---|---|---|---|---|---|
| Content of oil (B) in entire oil in oil phase (wt %) | 0 | 16.6 | 16.7 | 33.3 | 16.7 |
| Content of oil (C) in entire oil in oil phase (wt %) | 66.6 | 66.8 | 66.8 | 33.3 | 0 |
| Total amount of oils (A) and (B) in entire oil in oil phase (wt %) | 33.3 | 33.2 | 33.3 | 66.6 | 33.3 |
| Crystallinity of oil after storage at 5° C. for 4 days (%) | 37.3 | 71.4 | 76.7 | 85.7 | 69.0 |
| Crystallinity of oil after storage at 5° C. for 1 hour (%) | 43.3 | 71.2 | 82.7 | 85.7 | 71.3 |
| Crystallinity of oil after storage at 15° C. for 30 minutes (%) | 45 | 70.8 | 82.7 | 84.7 | 67.3 |
| X-Y (%) | -1.7 | 0.4 | 0 | 1.0 | 4.0 |

TABLE 4

Composition and evaluation result of foaming oil-in-water emulsified oil compositions (blending unit: wt parts)

| | | | Example 1 | Example 2 | Example 3 | Example 4 | Comparative Example 1 |
|---|---|---|---|---|---|---|---|
| Oil phase | Oil (A) | Palm kernel stearin (IV7.5) | 5 | 5 | 8 | 2 | |
| | Oil (B) | Hardened palm kernel oil (rising slip point: 36° C.) | 5 | 5 | 2 | 8 | 10 |
| | Palm kernel oil | | 18 | 13 | 18 | 20 | 18 |
| | Coconut oil | | | 5 | | | |
| | Oil 1 | | 2 | | 2 | | 2 |
| | Oil 2 | | | 2 | | | |
| | Palm oil | | | | | | |
| | Soy bean lecithin | | 0.20 | 0.20 | 0.20 | 0.20 | 0.20 |
| | Polyglycerin fatty acid ester (HLB = 4) | | 0.10 | 0.10 | 0.10 | 0.10 | 0.10 |
| Aqueous phase | Sodium hexametaphosphate | | 0.07 | 0.07 | 0.07 | 0.07 | 0.07 |
| | Guar gum | | 0.05 | 0.05 | 0.05 | 0.05 | 0.05 |
| | Xanthan gum | | 0.01 | 0.01 | 0.01 | 0.01 | 0.01 |
| | Polyglycerin fatty acid ester (HLB = 11) | | 0.15 | 0.15 | 0.15 | 0.15 | 0.15 |
| | Sucrose fatty acid ester (HLB = 11) | | 0.05 | 0.05 | 0.05 | 0.05 | 0.05 |
| | Skim milk powder | | 4.00 | 4.00 | 4.00 | 4.00 | 4.00 |
| | Whey powder | | 1.00 | 1.00 | 1.00 | 1.00 | 1.00 |
| | Water | | 64.37 | 64.37 | 64.37 | 64.37 | 64.37 |
| | Total | | 100.0 | 100.0 | 100.0 | 100.0 | 100.0 |
| Temperature of storage of raw solution | 5° C. for 4 days | Texture (mouth melting characteristics) | A | A | A | B | D |
| | | Overrun (%) | 135 | 132 | 118 | 128 | 140 |
| | | Evaluation of overrun | A | A | B | A | A |
| | | Hardness immediately after whipping (N) | 0.35 | 0.29 | 0.27 | 0.31 | 0.31 |
| | | Evaluation of hardness immediately after whipping | A | B | B | A | A |
| | | Hardness after storage at 20° C. for 30 minutes after whipping | 0.21 | 0.3 | 0.25 | 0.33 | 0.4 |
| | | Change in hardness over time (hardness immediately after · hardness after storage for 30 minutes (N)) | -0.01 | 0.01 | 0.02 | -0.02 | -0.09 |
| | | Evaluation of change in hardness over time | A | A | B | B | D |
| | 5° C. for 4 days and 12.6° C. for 3 hours | Texture (mouth melting characteristics) | A | A | A | B | D |
| | | Overrun (%) | 131 | 123 | 110 | 132 | 98 |
| | | Evaluation of overrun | A | A | B | A | D |
| | | Hardness immmediately after whipping (N) | 31 | 28 | 27 | 32 | 35 |
| | | Evaluation of hardness immediately after whipping | A | B | B | A | B |

(blending unit: wt parts)

| | | | Comparative Example 2 | Comparative Example 3 | Comparative Example 4 | Comparative Example 6 | Comparative Example 6 |
|---|---|---|---|---|---|---|---|
| Oil phase | Oil (A) | Palm kernel stearin (IV7.5) | 10 | 8.3 | 2.5 | 10 | 5 |
| | Oil (B) | Hardened palm kernel oil (rising slip point: 36° C.) | | 8.3 | 2.5 | 10 | 5 |
| | Palm kernel oil | | 18 | 30 | 10 | 10 | |
| | Coconut oil | | | | | | |
| | Oil 1 | | 2 | 3.4 | | | |
| | Oil 2 | | | | | | |
| | Palm oil | | | | | | 20 |
| | Soy bean lecithin | | 0.20 | 0.20 | 0.20 | 0.20 | 0.20 |
| | Polyglycerin fatty acid ester (HLB = 4) | | 0.10 | 0.10 | 0.10 | 0.10 | 0.10 |
| Aqueous phase | Sodium hexametaphosphate | | 0.07 | 0.07 | 0.07 | 0.07 | 0.07 |
| | Guar gum | | 0.05 | 0.05 | 0.05 | 0.05 | 0.05 |
| | Xanthan gum | | 0.01 | 0.01 | 0.01 | 0.01 | 0.01 |
| | Polyglycerin fatty acid ester (HLB = 11) | | 0.15 | 0.15 | 0.15 | 0.15 | 0.15 |
| | Sucrose fatty acid ester (HLB = 11) | | 0.05 | 0.05 | 0.05 | 0.05 | 0.05 |
| | Skim milk powder | | 4.00 | 4.00 | 4.00 | 4.00 | 4.00 |

TABLE 4-continued

Composition and evaluation result of foaming oil-in-water emulsified oil compositions

|  |  |  | | | | | |
|---|---|---|---|---|---|---|---|
|  |  | Whey powder | 1.00 | 1.00 | 1.00 | 1.00 | 1.00 |
|  |  | Water | 64.37 | 44.37 | 79.37 | 64.37 | 64.37 |
|  |  | Total | 100.0 | 100.0 | 100.0 | 100.0 | 100.0 |
| Temperature of storage of raw solution | 5° C. for 4 days | Texture (mouth melting characteristics) | A | D | A | D | D |
|  |  | Overrun (%) | 85 | 110 | 68 | 135 | 128 |
|  |  | Evaluation of overrun | D | B | D | A | A |
|  |  | Hardness immediately after whipping (N) | 0.19 | 0.47 | 0.17 | 0.44 | 0.26 |
|  |  | Evaluation of hardness immediately after whipping | D | D | D | C | B |
|  |  | Hardness after storage at 20° C. for 30 minutes after whipping | 0.17 | 0.49 | 0.16 | 0.5 | 0.25 |
|  |  | Change in hardness over time (hardness immediately after · hardness after storage for 30 minutes (N)) | 0.02 | −0.02 | 0.01 | −0.04 | 0.01 |
|  |  | Evaluation of change in hardness over time | B | B | A | C | A |
|  | 5° C. for 4 days and 12.6° C. for 3 hours | Texture (mouth melting characteristics) | A | C | A | D | D |
|  |  | Overrun (%) | 79 | 108 | 67 | 133 | 95 |
|  |  | Evaluation of overrun | D | C | D | A | D |
|  |  | Hardness immmediately after whipping (N) | 18 | 45 | 16 | 40 | 23 |
|  |  | Evaluation of hardness immediately after whipping | D | D | D | C | C |

Example 2

Preparation and Evaluation of Foamable Oil-in-Water Emulsified Oil Composition 2

A foamable oil-in-water emulsified oil composition 2 (hereinafter, referred to as the "inventive composition 2") was prepared in a manner similar to Preparative Example 3, except that the composition of the oils in the oil phase was changed in accordance with the composition shown in Table 3. The crystallinity of the oil in the inventive composition 2 was favorably 73% after storage at 5° C. (setting) for 4 days. Similarly, the crystallinity of the oil after the inventive composition 2 obtained was stored at 5° C. (setting) for 1 hour and the crystallinity of the oil after it is stored at 5° C. (setting) for 1 hour and additionally at 15° C. (setting) for 30 minutes were determined, and the difference between them was 0.3%. The results are summarized in Table 3.

Then, the inventive composition 2 was stored at 5° C. (setting) for 4 days and additionally at 12.5° C. (setting) for 3 hours and then whipped by the method described above. The texture, overrun, hardness and change in hardness over time of the whipped cream obtained were determined by the methods described above. The results are summarized in Table 4.

Example 3

Preparation and Evaluation of Foamable Oil in Water Emulsified Oil Composition 3

A foamable oil-in-water emulsified oil composition 3 (hereinafter, referred to as the "inventive composition 3") was prepared in a manner similar to Preparative Example 3, except that the composition of the oils in the oil phase was changed in accordance with the composition shown in Table 3. The crystallinity of the oil in the inventive composition 3 was favorably 69% after storage at 5° C. (setting) for 4 days. Similarly, the crystallinity of the oil after the inventive composition 3 obtained was stored at 5° C. (setting) for 1 hour and the crystallinity of the oil after it is stored at 5° C. (setting) for 1 hour and additionally at 15° C. (setting) for 30 minutes were determined, and the difference between them was 0.4%. The results are summarized in Table 3.

Then, the inventive composition 3 was stored at 5° C. (setting) for 4 days and additionally at 12.5° C. (setting) for 3 hours and then whipped by the method described above. The texture, overrun, hardness, and change in hardness over time of the whipped cream obtained were determined by the methods described above. The results are summarized in Table 4.

Example 4

Preparation and Evaluation of Foamable Oil-in-Water Emulsified Oil Composition 4

A foamable oil-in-water emulsified oil composition 4 (hereinafter, referred to as the "inventive composition 4") was prepared in a manner similar to Preparative Example 3, except that the composition of the oils in the oil phase was changed in accordance with the composition shown in Table 3. The crystallinity of the oil in the inventive composition 4 was favorably 73.7% after storage at 5° C. (setting) for 4 days. Similarly, the crystallinity of the oil after the inventive composition 4 obtained was stored at 5° C. (setting) for 1 hour and the crystallinity of the oil after it is stored at 5° C. (setting) for 1 hour and additionally at 15° C. (setting) for 30 minutes were determined, and the difference between them was 1.3%. The results are summarized in Table 3.

Then, the inventive composition 4 was stored at 5° C. (setting) for 4 days and additionally at 12.5° C. (setting) for 3 hours, and then whipped by the method described above. The texture, overrun, hardness, and change in hardness over time of the whipped cream obtained were determined by the methods described above. The results are summarized in Table 4.

Comparative Example 1

Preparation and Evaluation of Foamable Oil-in-Water Emulsified Oil Composition 5

A foamable oil-in-water emulsified oil composition 5 (hereinafter, referred to as the "comparative composition 5") was prepared in a manner similar to Preparative Example 3, except that the composition of the oils in the oil phase was changed in accordance with the composition shown in Table 3. The crystallinity of the oil in the comparative composition 5 was favorably 80.7% after storage at 5° C. (setting) for 4 days. Similarly, the crystallinity of the oil after the comparative composition 5 obtained was stored at 5° C. (setting) for 1 hour and the crystallinity of the oil after it is stored at 5° C. (setting) for 1 hour and additionally at 15° C. (setting) for 30 minutes were determined, and the difference between them was 7.7%. The results are summarized in Table 3.

Then, the comparative composition 5 was stored at 5° C. (setting) for 4 days and additionally at 12.5° C. (setting) for 3 hours, and then whipped by the method described above. The texture, overrun, hardness, and change in hardness over time of the whipped cream obtained were determined by the methods described above. The results are summarized in Table 4.

Comparative Example 2

Preparation and Evaluation of Foamable
Oil-in-Water Emulsified Oil Composition 6

A foamable oil-in-water emulsified oil composition 6 (hereinafter, referred to as the "comparative composition 6") was prepared in a manner similar to Preparative Example 3, except that the composition of the oils in the oil phase was changed in accordance with the composition shown in Table 3. The crystallinity of the oil in the comparative composition 6 was unfavorably 37.3% after storage at 5° C. (setting) for 4 days, indicating that the oil was not crystallized sufficiently.

Similarly, the crystallinity of the oil after the comparative composition 6 obtained was stored at 5° C. (setting) for 1 hour and the crystallinity of the oil after it is stored at 5° C. (setting) for 1 hour and additionally at 15° C. (setting) for 30 minutes were determined, and the difference between them was −1.7%. The results were abnormal, as the crystallinity after storage at 5° C. for hour and additionally at 15° C. for 30 minutes was higher than the crystallinity simply after storage at 5° C. for 1 hour. The results show that the oil was not crystallized favorably. The results are summarized in Table 3.

Then, the comparative composition 6 was stored at 5° C. (setting) for 4 days and additionally at 12.5° C. (setting) for 3 hours and whipped by the method described above. The texture, overrun, hardness, and change in hardness over time of the whipped cream obtained were determined by the methods described above. The results are summarized in Table 4.

Comparative Example 3

Preparation and Evaluation of Foamable
Oil-in-Water Emulsified Oil Composition 7

A foamable oil-in-water emulsified oil composition 7 (hereinafter, referred to as the "comparative composition 7") was prepared in a manner similar to Preparative Example 3, except that the composition of the oils in the oil phase was changed in accordance with the composition shown in Table 3 and the water content was adjusted. The crystallinity of the oil in the comparative composition 7 was favorably 71.4% after storage at 5° C. (setting) for 4 days. Similarly, the crystallinity of the oil after the comparative composition 7 obtained was stored at 5° C. (setting) for 1 hour and the crystallinity of the oil after it is stored at 5° C. (setting) for 1 hour and additionally at 15° C. (setting) for 30 minutes were determined, and the difference between them was 0.4%. The results are summarized in Table 3.

Then, the comparative composition 7 was stored at 5° C. (setting) for 4 days and additionally at 12.5° C. (setting) for 3 hours and whipped by the method described above. The texture, overrun, hardness, and change in hardness over time of the whipped cream obtained were determined by the methods described above. The results are summarized in Table 4.

Comparative Example 4

Preparation and Evaluation of Foamable
Oil-in-Water Emulsified Oil Composition 8

A foamable oil-in-water emulsified oil composition 8 (hereinafter, referred to as the "comparative composition 8") was prepared in a manner similar to Preparative Example 3, except that the composition of the oils in the oil phase was changed in accordance with the composition shown in Table 3 and the water content was adjusted. The crystallinity of the oil in the comparative composition 8 was favorably 76.7% after storage at 5° C. (setting) for 4 days. Similarly, the crystallinity of the oil after the comparative composition 8 obtained is stored at 5° C. (setting) for 1 hour and the crystallinity of the oil after it is stored at 5° C. (setting) for 1 hour and additionally at 15° C. (setting) for 30 minutes were determined, and the difference between them was 0%. The results are summarized in Table 3.

Then, comparative composition 8 was stored at 5° C. (setting) for 4 days and additionally at 12.5° C. (setting) for 3 hours and whipped by the method described above. The texture, overrun, hardness, and change in hardness over time of the whipped cream obtained were determined by the methods described above. The results are summarized in Table 4.

Comparative Example 5

Preparation and Evaluation of Foamable
Oil-in-Water Emulsified Oil Composition 9

A foamable oil-in-water emulsified oil composition 9 (hereinafter, referred to as the "comparative composition 9") was prepared in a manner similar to Preparative Example 3, except that the composition of the oils in the oil phase was changed in accordance with the composition shown in Table 3. The crystallinity of the oil in the comparative composition 9 was favorably 85.7% after storage at 5° C. (setting) for 4 days. Similarly, the crystallinity of the oil after the comparative composition 9 obtained is stored at 5° C. (setting) for 1 hour and the crystallinity of the oil after it is stored at 5° C. (setting) for 1 hour and additionally at 15° C. (setting) for 30 minutes were determined, and the difference between them was 1.0%. The results are summarized in Table 3.

Then, comparative composition 9 was stored at 5° C. (setting) for 4 days and additionally at 12.5° C. (setting) for 3 hours and whipped by the method described above. The texture, overrun, hardness, and change in hardness over time of the whipped cream obtained were determined by the methods described above. The results are summarized in Table 4.

Comparative Example 6

Preparation and Evaluation of Foamable
Oil-in-Water Emulsified Oil Composition 10

A foamable oil-in-water emulsified oil composition 10 (hereinafter, referred to as the "comparative composition 10") was prepared in a manner similar to Preparative Example 3, except that the composition of the oils in the oil phase was changed in accordance with the composition shown in Table 3. The crystallinity of the oil in the comparative composition 10 was favorably 69.0% after storage at 5° C. (setting) for 4 days. Similarly, the crystallinity of the oil after the comparative composition 10 obtained is stored at 5° C. (setting) for 1 hour and the crystallinity of the oil after it is stored at 5° C. (setting) for 1 hour and additionally at 15° C. (setting) for 30 minutes were determined, and the difference between them was 4.0%. The results are summarized in Table 3.

Then, comparative composition 10 was stored at 5° C. (setting) for 4 days and additionally at 12.5° C. (setting) for 3 hours and whipped by the method described above. The texture, overrun, hardness, and change in hardness over time of the whipped cream obtained were determined by the methods described above. The results are summarized in Table 4.

As obvious from the results above, all of the inventive compositions 1 to 4 obtained in Examples 1 to 4 showed favorable mouth melting characteristics and also whipping characteristics at a level higher than normal level even when the liquid temperature changed during storage. Specifically, as for the whipping characteristics, the overrun was 11.0% or more even after storage at 5° C. (setting) for 4 days and additionally at 12.5° C. (setting) for 3 hours, and the change was 8% or less. In addition, the whipped creams prepared from the inventive compositions 1 to 4 of Examples 1 to 4 were all favorable in hardness and showed smaller change in hardness over time and thus, they are very superior in whip physical properties such as processability and appearance after whipped cream applying.

In contrast in Comparative Examples 1 to 6 (comparative compositions 5 to 10), the whipped creams prepared from the comparative compositions 5, 7, 9, and 10 (other than those of Comparative Examples 2 and 4) were unfavorable in mouth melting characteristics, independently of the change in the temperature of the raw solution during storage. The whipped creams prepared from the comparative compositions 6 and 8 of Comparative Examples 2 and 4 were favorable in mouth melting characteristics, but did not have a sufficient overrun and were too soft immediately after whipping and thus unfavorable in whip physical properties such as processability for example in topping and appearance after whipped cream applying.

Embodiments of the present invention that are considered favorable at this moment have been described, but such disclosure should not be construed limitedly. Various variations and modifications will be possible from the disclosure by those who are skilled in the art. Therefore, the scope of the attached claims should be construed to include all possible variations and modifications within the true spirit and the scope of the present invention.

INDUSTRIAL APPLICABILITY

Although the oil content is relatively lower, the foamable oil in water emulsified oil composition according to the present invention has favorable whipping characteristics and show very small change in whipping characteristics by temperature fluctuation. In addition, the whipped creams prepared from the foamable oil-in-water emulsified oil compositions according to the present invention are superior in mouth melting characteristics, remain soft during handling at room temperature, are favorable in whip physical properties such as processability and appearance after whipped cream applying, and retain these characteristics even during chilled distribution. For that reason, the whipped creams according to the present invention can be used favorably in confectioneries and desserts, as they are distributed as chilled.

The invention claimed is:

1. A foamable oil-in-water emulsified oil composition containing an oil for chilled-distribution whipped creams, which comprises:
   a content of the oil is 20 wt % to 40 wt % with respect to a total amount of the composition;
   the oil contains an oil A and an oil B;
   the oil A is at least one member selected from the group consisting of palm kernel stearin and hardened palm kernel stearin which contains triglycerides in which the constituent fatty acids have a total carbon atom number of 36 and triglycerides in which the constituent fatty acids have a total carbon atom number of 38, in a total amount of 40 wt % or more with respect to a total amount of the oil A, and have a rising slip point of 30° C. or higher;
   the oil B is at least one member selected from the group consisting of a hardened palm kernel oil and a hardened coconut oil;
   a content of the oil A is 1 wt % to 30 wt % with respect to a total amount of the oil;
   a content of the oil B is 15 wt % to 30 wt % with respect to the total amount of the oil;
   a total content of the oils A and B is 15 wt % to 50 wt %, with respect to the total amount of the oil;
   a crystallinity of the oil after the composition is stored at 5° C. for 4 days is 50% or more; and
   a difference between the crystallinity of the oil after the composition is stored at 5° C. for 1 hour and the crystallinity of the oil after the composition is stored at 5° C. for 1 hour time and additionally at 15° C. for 30 minutes is 2% or less;
   wherein the composition does not become harder in handling at room temperature after whipping.

2. A whipped cream, comprising the foamable oil-in-water emulsified oil composition for chilled-distribution whipped creams according to claim 1.

3. The foamable oil-in-water emulsified oil composition for chilled-distribution whipped creams according to claim 1, wherein the oil A is palm kernel stearin.

4. A whipped cream, comprising the foamable oil-in-water emulsified oil composition for chilled-distribution whipped creams according to claim 3.

5. The foamable oil-in-water emulsified oil composition for chilled-distribution whipped creams according to claim 1, wherein the oil contains additionally an oil that has a rising slip point of lower than 30° C. other than the oil B.

6. A whipped cream, comprising the foamable oil-in-water emulsified oil composition for chilled-distribution whipped creams according to claim 5.

7. The foamable oil-in-water emulsified oil composition for chilled-distribution whipped creams according to claim 5, wherein the oil A is palm kernel stearin.

8. A whipped cream, comprising the foamable oil-in-water emulsified oil composition for chilled-distribution whipped creams according to claim 7.

9. The foamable oil-in-water emulsified oil composition for chilled-distribution whipped creams according to claim 1, wherein the oil contains a lauric acid-type oil and the content of the lauric acid-type oil is 60 wt % or more with respect to the total amount of the oil.

10. A whipped cream, comprising the foamable oil-in-water emulsified oil composition for chilled-distribution whipped creams according to claim 9.

11. The foamable oil-in-water emulsified oil composition for chilled-distribution whipped creams according to claim 9, wherein the oil A is palm kernel stearin.

12. A whipped cream, comprising the foamable oil-in-water emulsified oil composition for chilled-distribution whipped creams according to claim 11.

13. The foamable oil-in-water emulsified oil composition for chilled-distribution whipped creams according to claim 9, wherein the oil contains additionally an oil that has a rising slip point of lower than 30° C. other than the oil B.

14. A whipped cream, comprising the foamable oil-in-water emulsified oil composition for chilled-distribution whipped creams according to claim 13.

15. The foamable oil-in-water emulsified oil composition for chilled-distribution whipped creams according to claim 13, wherein the oil A is palm kernel stearin.

16. A whipped cream, comprising the foamable oil-in-water emulsified oil composition for chilled-distribution whipped creams according to claim 15.

* * * * *